(12) United States Patent
Meyer

(10) Patent No.: US 11,181,396 B2
(45) Date of Patent: Nov. 23, 2021

(54) NOISE-RESISTANT INTERMITTENTLY OPERATING INCREMENTAL POSITION SENSOR

(71) Applicant: hemy8 SA, Morges (CH)

(72) Inventor: Hans Uhich Meyer, Morges (CH)

(73) Assignee: hemy8 SA, Morges (CH)

( * ) Notice: Subject to any disclaimer, the term of this patent is extended or adjusted under 35 U.S.C. 154(b) by 11 days.

(21) Appl. No.: 16/378,975

(22) Filed: Apr. 9, 2019

(65) Prior Publication Data

US 2019/0310109 A1 Oct. 10, 2019

Related U.S. Application Data

(60) Provisional application No. 62/655,344, filed on Apr. 10, 2018.

(51) Int. Cl.
| | | |
|---|---|---|
| *G01D 5/20* | (2006.01) | |
| *G01D 5/244* | (2006.01) | |
| *G01D 5/245* | (2006.01) | |

(52) U.S. Cl.
CPC ......... *G01D 5/2066* (2013.01); *G01D 5/2046* (2013.01); *G01D 5/2451* (2013.01); *G01D 5/24466* (2013.01); *G01D 5/24471* (2013.01); *G01D 5/24476* (2013.01)

(58) Field of Classification Search
CPC ............... G01D 5/2066; G01D 5/2046; G01D 5/24466; G01D 5/24471; G01D 5/24476; G01D 5/2451
See application file for complete search history.

(56) References Cited

U.S. PATENT DOCUMENTS

| | | | | |
|---|---|---|---|---|
| 5,184,590 A | * | 2/1993 | Hashimoto | ........... F02P 5/1502 123/406.58 |
| 2005/0157829 A1 | * | 7/2005 | Aoyama | ................... H03L 7/08 375/376 |
| 2012/0049869 A1 | * | 3/2012 | Kremin | ................... G06F 3/044 324/679 |
| 2018/0340799 A1 | * | 11/2018 | Goto | .................. G01D 5/34715 |

FOREIGN PATENT DOCUMENTS

WO WO-2017126339 A1 * 7/2017 ........... G01D 5/3473

* cited by examiner

*Primary Examiner* — Clayton E. LaBalle
*Assistant Examiner* — Michael A Harrison
(74) *Attorney, Agent, or Firm* — Renner Kenner Greive Bobak Taylor & Weber

(57) ABSTRACT

A method of operating an intermittently measuring or pulsed incremental position sensor, and a position sensor that has noise detecting circuitry activated during each measurement, triggering corrective measurements as long as the influence of noise is detected. Corrective measurements immediately follow and replace a noise-influenced measurement well before the next scheduled measurement. Noise can be detected as a differential amplifier's common-mode input signal, thus clearly separating the influence of noise from the sensor's differential input signal.

16 Claims, 3 Drawing Sheets

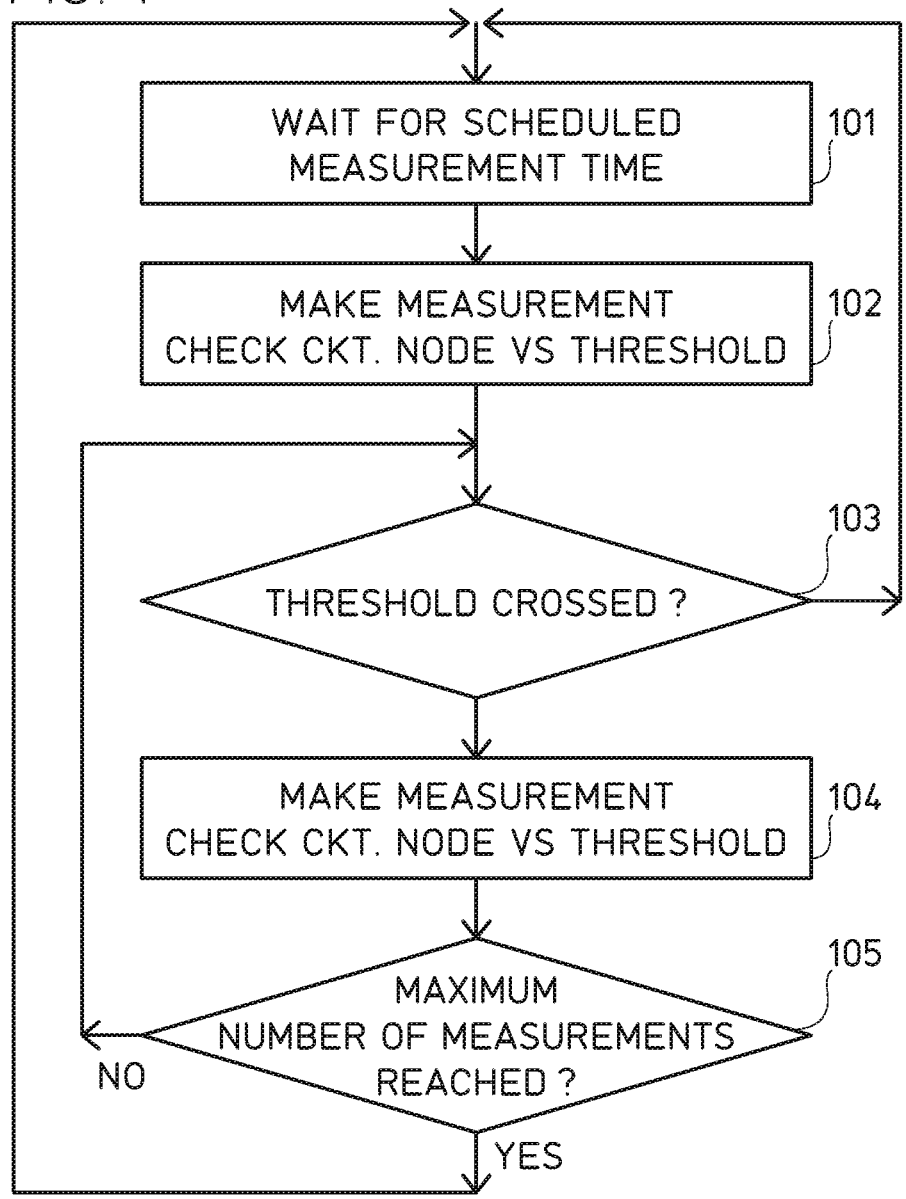

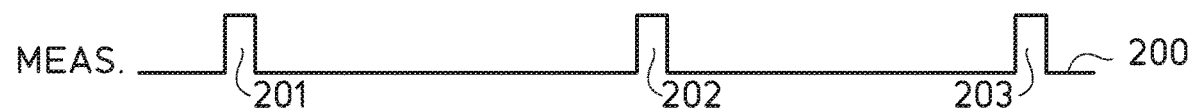
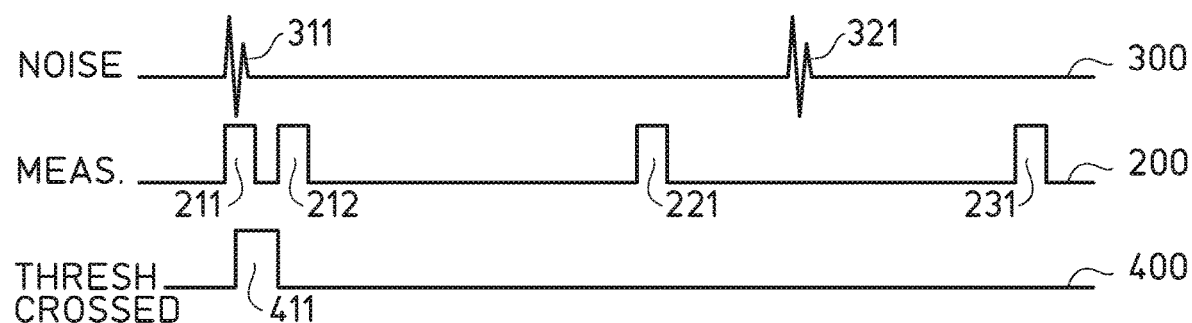
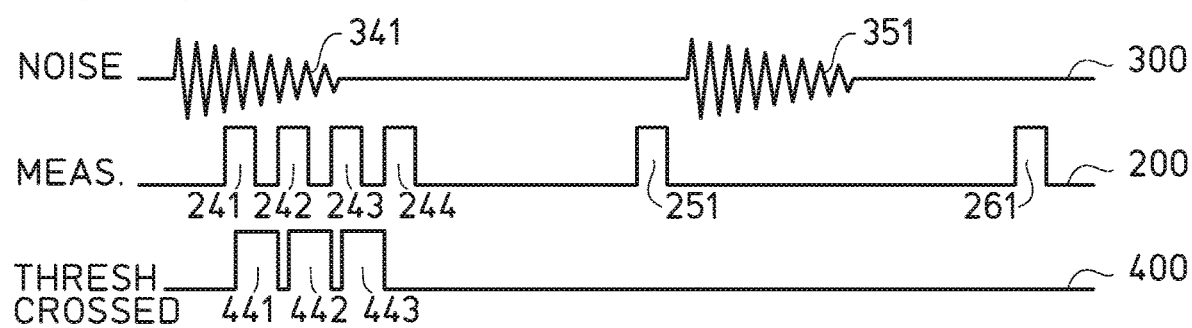
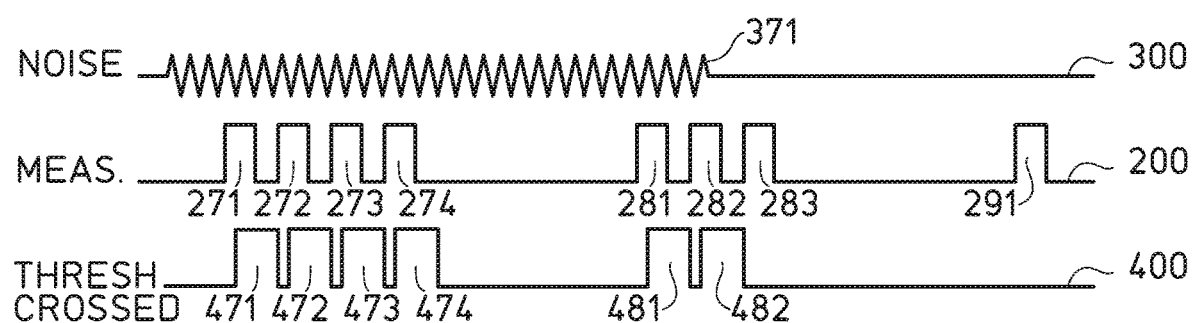

NOISE-RESISTANT INTERMITTENTLY OPERATING INCREMENTAL POSITION SENSOR

FIELD OF THE INVENTION

The invention relates to intermittently operating incremental position sensors' immunity against electromagnetic interference (EMI), and more specifically against impulse noise.

BACKGROUND OF THE INVENTION

Incremental position sensors are simpler, cheaper and more compact than equivalent absolute position sensors. However, their position output is cyclical, going repeatedly from zero to one increment over each increment of travel. For instance, a resolver's angular position output goes from 0° to 360°, repeating over the next one turn increments.

To detect absolute position, incremental sensors start from a known position then track motion from the travel between successive measurements. These must be spaced closely enough to avoid an accidental position output shift of one or more increments. Such a shift then only occurs if there is loss of power during motion, or over-speed, or disrupting influence of electromagnetic noise. While loss of power and over-speed are easily detectable, the influence of electromagnetic noise is more difficult to detect and correct.

Intermittently measuring or pulsed incremental position sensors are widely used in battery-operated measuring tools, as disclosed for example in U.S. Pat. No. 6,011,389 to Masreliez et al. and in U.S. Pat. No. 7,015,687 to Meyer. These sensors are inductive and operate by pulsed drive coils coupled via a spatially periodic scale to sense coils, but any kind of intermittently measuring incremental sensor may benefit from the invention. Intermittent operation has the advantages of low power consumption, but the short pulses reduce the sensors' immunity to similarly shaped impulse noise.

U.S. Pat. No. 6,331,759 to Atmur proposes to decrease noise influence in a pulsed resolver essentially by increasing the drive signal. However, in order to avoid increased power consumption the duty cycle has to be reduced accordingly, i.e., the pulses made shorter.

In any such intermittently operating position sensor, a single noise-corrupted measurement may cause position loss. This makes pulsed sensors sensitive to short electromagnetic noise impulses like those produced from switching transients or from electrostatic discharges, so that their interference needs to be reliably detected and corrected, or at least flagged.

SUMMARY OF THE INVENTION

It is an object of the invention to improve intermittently measuring incremental position sensors' immunity against electromagnetic interference (EMI), and more specifically against impulse noise.

According to a first aspect of the invention there is provided a method of measuring incremental positon in a position sensor circuit, the method including:
  determining a first scheduled measurement signal,
  determining a noise influence on the first scheduled measurement signal at at least one circuit node of the position sensor, and
  if the determined noise influence exceeds a threshold, determining a corrective measurement signal and replacing the first scheduled measurement signal with the corrective measurement signal such that the corrective measurement signal becomes the first scheduled measurement signal.

Preferably, prior to replacing the first scheduled measurement signal with the corrective measurement signal:
  determining a noise influence on the corrective measurement signal at at least the one circuit node, and
  if the determined noise influence on the corrective measurement signal exceeds the threshold, then determining a subsequent corrective measurement signal and determining a noise influence on the subsequent corrective measurement signal,
  if the determined noise influence on the corrective measurement signal exceeds the threshold, then repeating steps of determining a subsequent corrective measurement signal and determining a noise influence on the subsequent corrective measurement signal until (i) the determined noise influence is below the threshold, or (ii) the number of repeating steps exceeds a second threshold, and
  replacing the first scheduled measurement signal with a latest one of the subsequent corrective measurement signals such that the latest one of the subsequent corrective measurement signals becomes the first scheduled measurement signal.

Preferably, if a determined noise influence of any preceeding step is below the threshold, then determining a second scheduled measurement signal.

Preferably, the method further includes:
  determining from the first and second scheduled measurements an incremental change in positon, and
  if the incremental change in positon exceeds a second threshold, then generate an error signal.

Preferably, the at least one circuit node of the position sensor is at an input amplifier of the sensor.

According to a second aspect of the invention there is provided an intermittently measuring incremental position sensor circuit including,
  a sensing winding for detecting a measurement signal, and
  noise canceling circuit connected with the sensing winding and configured to measuring incremental positon according to any one of claims 1 to 5.

According to a third aspect of the invention there is provided an intermittently measuring incremental position sensor circuit, wherein noise canceling means prompt a corrective measurement signal after a measurement signal in which the noise influence on at least one circuit node crossed a threshold, the corrective measurement signal replacing the measurement signal before it.

Preferably, the noise canceling means, in case the noise influence on the at least one circuit node has crossed a threshold in all corrective measurement signals, stop prompting for corrective measurement signals after a specified number of measurement signals has been reached.

Preferably, all corrective measurement signals replacing a scheduled measurement signal take place before the next scheduled measurement signal.

Preferably, there is error detecting means for raising an error flag upon detection of a sequence of measurement signals indicating sudden unexpected changes in position.

Preferably, wherein a raised error flag outputs an error signal from the sensor.

Preferably, the at least one circuit node is located in the position sensor's at least one input amplifier.

Preferably, the at least one input amplifier is a differential amplifier and wherein the at least one circuit node's voltage relates to the differential amplifier's common mode input voltage.

Preferably, the intermittently activated position sensor includes at least one drive coil and at least one sense coil whose mutual coupling is a function of the position of a movable scale, at least one differential amplifier whose sampling inputs are connected to a sense coil, and wherein the at least one circuit node is the node connecting the differential amplifier's input transistors' sources or emitters to its current source.

Further aspects of the invention will become apparent from the following description and accompanying drawings which is given by way of example only.

BRIEF DESCRIPTION OF THE DRAWING

FIG. 1 shows a flowchart of a measuring sequence according to the invention and how it reacts to noise.

FIG. 2A shows a timing diagram of a measurement sequence in the absence of noise.

FIG. 2B shows by way of example a timing diagram of a measurement sequence in the presence of short noise impulses.

FIG. 2C shows by way of example a timing diagram of a measurement sequence in the presence of longer noise impulses.

FIG. 2D shows by way of example a timing diagram of a measurement sequence in the presence of a too long lasting noise impulse.

DESCRIPTION OF THE INVENTION

Figure 3:
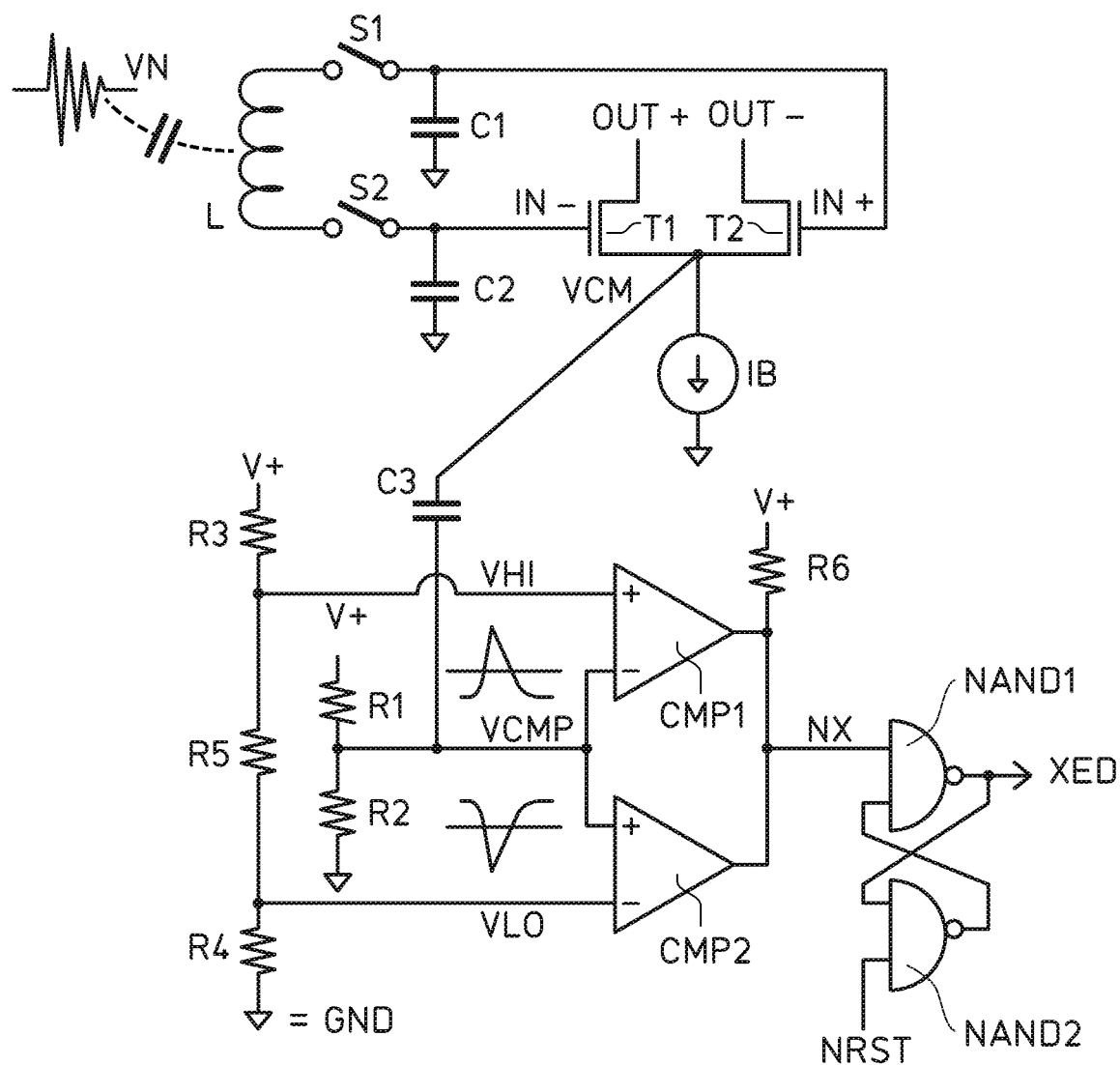
FIG. 3 shows schematically and by way of example the noise canceling means of a preferred embodiment of the invention.

The exemplary flowchart in FIG. 1 shows how an intermittent measuring sequence, which is assumed to have started before and continues in a repeating loop described by the flowchart, reacts to noise. Herein, noise always refers to electromagnetic noise.

Starting arbitrarily from step 101, waiting for a scheduled measurement time, for example provided by a clock signal, the sequence goes on to step 102, making a scheduled measurement, at the scheduled measurement time. While making the measurement, a circuit node's signal is checked on whether or not it crosses a threshold. The terms "circuit node", "signal" and "threshold" will be discussed in more detail when commenting FIG. 3, but essentially the circuit node is chosen as one whose signal, such as a voltage or current, or a voltage or current rate of change, is primarily a function of picked-up noise, and the threshold or thresholds chosen so that noise too weak to cross a threshold is unlikely to cause a permanent shift in sensed position. Once the measurement is done, the sequence goes on to step 103, taking a decision basing on whether a threshold was crossed or not during the measurement in step 102. If not, the sequence returns to step 101, waiting for the next scheduled measurement. If a threshold was crossed, step 104 is next, making a corrective measurement for replacing the previous measurement, most likely corrupted by noise. After the corrective measurement of step 104, step 105 is next, checking whether a specified maximal number of measurements, starting with the scheduled measurement, has been reached. If it has, the sequence returns to step 101, waiting for the next scheduled measurement. If not, it returns to step 103, taking a decision basing on whether a threshold was crossed or not during the previous measurement in step 104. If not, the sequence returns to step 101, waiting for the next scheduled measurement. If a threshold was crossed, step 104 is next, making an additional corrective measurement.

The only differences between scheduled and corrective measurements are that the former occur at specified time intervals while the latter follow the previous measurement within a short delay, and also that scheduled measurements do not cancel or replace previous measurements, whereas corrective measurements always do. As a result, it is always the last measurement in the chain started with the scheduled measurement which in effect corrects or cancels all the others, even if a threshold was crossed during the measurement for which the maximal number of measurements was reached. In this case, the measurement chain would then include a corrupted measurement, so that it should be checked for consistency, after which the corrupted measurement would be either disregarded, or corrected, or an error signaled. The noise canceling means according to the invention may thus fail in case of a lasting burst of high frequency noise. However, this is unlikely to happen, as a noise impulse's amplitude is in general inversely related to its duration: a long noise burst would have to be very powerful or very near the sensor to make a circuit node's signal cross a threshold over a number of succeeding measurements.

As a remark, the exemplary flowchart of FIG. 1 could be re-arranged while still having essentially the same function. For example, step 105 "MAXIMUM NUMBER OF MEASUREMENTS REACHED?" could be inserted between steps 102 and 103, with "YES" still branching to step 101 and "NO" to step 103, and step 104 still branching, this time back, to step 105: the measuring sequences would react the same way to noise.

FIGS. 2A to 2D show timing diagrams of intermittent measuring sequences according to the invention: for clarity, "noise" 300 is symbolically displayed if it is significant and as a baseline if it is not, while "measurement" 200 and "threshold crossed" 400 are just shown as logical levels, i.e. 0 at the baseline, 1 if raised, i.e., a measurement being taken or a threshold crossed. In FIG. 2A, Noise is insignificant, resulting in no thresholds being crossed, so both "noise" and "threshold crossed" remain flat and are thus not shown.

FIG. 2A shows a timing diagram of an intermittent measurement sequence in the absence of noise or noise insignificant enough to make the circuit node's signal cross a threshold. The intermittent measuring sequence thus consists only of the scheduled measurements 201, 202, 203, as no corrective measurements take place.

FIG. 2B shows by way of example a timing diagram of an intermittent measurement sequence in the presence of short noise impulses 311 and 321. As noise impulse 311 interferes with the scheduled measurement 211, a "threshold crossed" signal 411 prompts a corrective pulse 212. As noise pulse 311 ended before corrective pulse 212 started, no threshold gets crossed anymore, so there is no more corrective measurement, and as a result the next measurement is the scheduled measurement 221. A further noise impulse 321 takes place between the scheduled measurements 221 and 231, but as it does not coincide with either of them it needs not be detected, and no more corrective measurement prompted.

FIG. 2C shows by way of example a timing diagram of an intermittent measurement sequence in the presence of longer noise impulses. These impulses last long enough to force the circuit node signal to cross a threshold in at least two successive measurements. Of course, this also depends on their timing: if for example such a noise impulse starts well before a scheduled measurement, it may end just after that measurement, and have the same effect as a short noise impulse. The longer noise impulse 341 interferes with a scheduled measurement pulse 241 so that a "threshold crossed" signal 441 prompts a corrective measurement 242, also affected by noise impulse 341, so that a "threshold crossed" signal 442 prompts a corrective measurement 243, still affected by noise impulse 341, so that a "threshold crossed" signal 443 prompts another corrective measurement 244, in which no significant noise is detected, so that this last corrective measurement 244 replaces scheduled measurement 241. A further longer noise impulse 351 does not affect the sensor, as it starts after a scheduled measurement 251 and stops before a scheduled measurement 261.

FIG. 2D shows by way of example a situation in which the scheme described fails to correct the scheduled measurement 271: a too long noise impulse 371 interferes with it and all its corrective measurements 272, 273, 274, prompted by the "threshold crossed" signals 471, 472, 473 and 474. The maximal number of measurements, four in this example, having been reached, last corrective measurement 274 will replace scheduled measurement 271 by an equally uncertain measurement. As noise burst 371 also interferes with the next scheduled measurement 281, prompting two corrective measurements 282, 283 by "threshold crossed" signals 481, 482, with the last measurement 283 unaffected by noise, so scheduled measurement 281 is canceled and replaced by a correct one. Further scheduled measurement 291 is unaffected.

Long and powerful enough noise bursts are rare but their effect is detected. As position errors in incremental position sensors are caused by an erroneous number of increments traveled between two measurements at a given displacement speed, erroneous positions from these uncorrected measurements can for example be detected by jumps in displacement speed calculated from successive positions sensed, and the position corrected by assuming small variations in speed. For example if displacements between successive positions are around 0.5 increments in a given direction and suddenly an increment is found to be 0.5 increments in the other direction, it is most likely that the real displacement was 0.5 increment in the initial direction, so that the measured error of one increment in the other direction can be corrected, i.e., canceled. Furthermore, this can be validated by checking the displacement from the corrected measurement to the next. This works for isolated uncorrected scheduled measurements, so that for two or more uncorrected scheduled measurements, raising an error flag would be the safer option. Such error-detecting schemes used alone exist, specifically for detecting over-speed, but are nevertheless mentioned here as a useful way to increase the already strong safety provided by the invention.

A key factor in a sensor according to the invention is an optimal identification of the influence of noise. As noise usually enters the sensor through its sensing inputs and is amplified before further analog or digital processing, it is best to choose a circuit node as near as possible to the inputs, i.e., located in the input amplifier or buffer. The signal detected on the node may be a voltage or current, or rather a voltage or current change, as the latter are primarily caused by high frequency noise spikes.

However, in the intermittently measuring, or pulsed, sensors considered here, the sensed signal is also a high frequency impulse signal similar to the sensed signal. An efficient way to separate the effects of noise and sensed signals is to use a differential amplifier for the sensed signal, and, as disclosed further, reduce coupling from noise to a pure common-mode signal, i.e., having the same polarity on both differential inputs at any time.

The noise canceling means of a preferred embodiment of the invention are shown by way of example in FIG. 3. Sensing is inductive, a sensing winding L picking up pulsed signals from a pulsed drive winding (not shown), the coupling between both windings being modulated by a scale (not shown). Winding L is connected via the sampling switches S1, S2, usually field-effect transistors (FETs), to the sampling capacitors C1, C2 and to the inputs IN−, IN+ consisting of the gates of the FETs T1, T2 forming a differential amplifier together with a bias current source IB connected to FETs' T1, T2 sources, forming a circuit node. This circuit node's voltage VCM is connected through a high pass filter, consisting of a capacitor C3 and resistors R1, R2, also used to the bias the input voltage VCMP of a "window comparator" consisting of two voltage comparators CMP1, CMP2 with their input voltage thresholds VHI and VLO set by the resistors R3, R4, R5 and their open drain outputs connected to a pull-up resistor R6. An "RS flip-flop" consisting of two cross-coupled NAND gates NAND1, NAND2, has one input connected to the window comparator's output NX, the other to a reset signal NRST and an output XED. Further processing of this output signal is straightforward, hence not shown, except the output signals OUT+, OUT− on the differential FET amplifier's drains.

The noise-canceling means operate as follows. Noise-generated voltage VN is coupled to sensing winding L. Magnetic coupling can be reduced in inductive incremental position sensors by multipolar sense windings, which are insensitive to the locally homogeneous magnetic fields generated by remote noise sources, but high frequency capacitive coupling, indicated by a capacitor symbol between noise source VN and sensing winding L cannot be reduced effectively by shielding, as eddy currents in the shield would also reduce magnetic coupling from the drive windings. Consequently, the capacitive coupling of voltage VN couples a common mode voltage (i.e., of same polarity) on both ends of winding L.

Measurements occur when drive windings are pulsed, inducing a differential signal (opposite polarity) at each end of winding L. During measurements, the signals on both ends of L are sampled by sampling switches, usually FETs, and held on sampling capacitors C1, C2, at inputs IN+, IN− on the gates of FET differential pair T1, T2, biased by current source IB. The voltage VCM on the circuit node connecting current source IB to the sources of transistors T1 and T2 essentially follows the inputs' IN+, IN− common-mode input voltage. It is a suitable circuit node for detecting the influence of noise, given that this node reacts fast and has low impedance. Voltage VCM is then coupled through capacitor C3, forming a high-pass filter together with resistors R1, R2, so that slow changes in voltage are ignored and only sudden voltage excursions, typically from noise, change the window comparator's input voltage VCMP. Whenever voltage VCMP, normally biased between the window comparator's threshold voltages VHI and VLO, crosses one of these, i.e., voltage VCMP is outside the voltage window limited by voltages VHI and VLO, either comparator CMP1 or CMP2 will pull the normally high window comparator's output NX low, as the comparators' outputs form a "Wired-OR" logic with pull-up resistor R6 on window comparator output NX. This sets the RS flip-flop's output XED high, until reset by signal NRST, always high during a measurement, goes low. As a result, output XED will be set high as soon as either window limit has been crossed during a measurement.

The rest of the noise canceling means' logic circuitry and its operation, not shown in FIG. 3, can easily be derived from the flowchart in FIG. 1: once output XED goes high after detecting the influence of noise during a measurement, and before being reset by a low level of signal NRST, a corrective measurement is prompted, i.e., the sense winding is sampled while a drive winding is pulsed.

The circuit shown by way of example in FIG. 3 has clearly defined separate functions for the sake of clarity. This might be quite different in an actual embodiment, especially in integrated sensor circuitry with undifferentiated functional blocks, e.g. where one circuit element might share two functions. The circuit node could be different, but behave in the same way, like for example the midpoint of two resistors or capacitors connected to inputs IN+ and IN− or to outputs OUT1 and OUT2, which would also follow the common mode input signal. There may be more than one drive winding. There may be more than one sense winding, either time-multiplexed into the same amplifier, or each winding provided with an amplifier and noise canceling means, whose XED outputs are all "ORed" together so that if any one winding picks up noise, a corrective measurement is prompted. Generally, any circuitry capable of reliably detecting noise influence likely to result in an incremental position shift and as a result prompting a corrective measurement would be within the scope of the invention.

The invention claimed is:

1. A method of measuring incremental position in an intermittently-measuring incremental position sensor circuit, the method including:
   determining a first scheduled measurement signal,
   determining a noise influence on the first scheduled measurement signal at at least one circuit node of the intermittently-measuring incremental position sensor circuit, and
   if the determined noise influence exceeds a threshold, prompting a corrective measurement signal and replacing the first scheduled measurement signal with the corrective measurement signal such that the corrective measurement signal becomes the first scheduled measurement signal;
   wherein all corrective measurement signals replacing a scheduled measurement signal take place before the next scheduled measurement signal.

2. The method of claim 1 wherein, prior to replacing the first scheduled measurement signal with the corrective measurement signal, the method comprises:
   determining a noise influence on the corrective measurement signal at the at least one circuit node, and
   if the determined noise influence on the corrective measurement signal exceeds the threshold, then prompting a subsequent corrective measurement signal and determining a noise influence on the subsequent corrective measurement signal,
   if the determined noise influence on the corrective measurement signal exceeds the threshold, then repeating steps of prompting a subsequent corrective measurement signal and determining a noise influence on the subsequent corrective measurement signal until (i) the determined noise influence is below the threshold, or (ii) the number of repeating steps exceeds a second threshold, and
   replacing the first scheduled measurement signal with a latest one of the subsequent corrective measurement signals such that the latest one of the subsequent corrective measurement signals becomes the first scheduled measurement signal.

3. The method of claim 2 wherein, if a determined noise influence of any preceding step is below the threshold, then determining a second scheduled measurement signal.

4. The method of claim 3, wherein the threshold is a first threshold, and the method further comprising:
   determining from the first and second scheduled measurements an incremental change in position, and
   if the incremental change in position exceeds a second threshold, generating an error signal.

5. The method of claim 1 wherein the at least one circuit node of the intermittently-measuring incremental position sensor circuit is at an input amplifier of the intermittently-measuring incremental position sensor circuit.

6. An intermittently measuring incremental position sensor circuit including:
   a sensing winding for detecting a measurement signal, and
   a noise canceling circuit connected with the sensing winding and configured to measure incremental position according to the method of claim 1.

7. An intermittently measuring incremental position sensor circuit, comprising:
   at least one input amplifier;
   at least on circuit node located in the at least on input amplifier; and
   noise canceling means configured to prompt a corrective measurement signal after a measurement signal in which a noise influence on the at least one circuit node crossed a threshold, the corrective measurement signal replacing the measurement signal before it, wherein the at least one input amplifier is a differential amplifier, and wherein voltage of the at least one circuit node relates to common mode input voltage of the differential amplifier.

8. The intermittently-measuring incremental position sensor circuit according to claim 7, wherein the noise canceling means, in case the noise influence on the at least one circuit node has crossed a threshold in all corrective measurement signals, stop prompting for corrective measurement signals after a specified number of measurement signals has been reached.

9. The intermittently-measuring incremental position sensor circuit according to claim 8, wherein all corrective measurement signals replacing a scheduled measurement signal take place before the next scheduled measurement signal.

10. The intermittently-measuring incremental position sensor circuit according to claim 7, further including error detecting means for raising an error flag upon detection of a sequence of measurement signals indicating sudden unexpected changes in position.

11. The intermittently-measuring incremental position sensor circuit according to claim 10, wherein a raised error flag outputs an error signal from the intermittently-measuring incremental position sensor circuit.

12. An intermittently-measuring incremental position sensor circuit comprising:
   noise canceling means configured to prompt a corrective measurement signal after a measurement signal in which a noise influence on at least one circuit node crossed a threshold, the corrective measurement signal replacing the measurement signal before it,
   at least one drive coil and at least one sense coil whose mutual coupling is a function of the position of a movable scale, and at least one differential amplifier whose sampling inputs are connected to a sense coil, wherein the at least one circuit node is the node connecting sources or emitters of input transistors of the differential amplifier to its current source.

13. The intermittently-measuring incremental position sensor circuit according to claim 12, wherein the noise canceling means, in case the noise influence on the at least one circuit node has crossed a threshold in all corrective measurement signals, stop prompting for corrective measurement signals after a specified number of measurement signals has been reached.

14. The intermittently-measuring incremental position sensor circuit according to claim 13, wherein all corrective measurement signals replacing a scheduled measurement signal take place before the next scheduled measurement signal.

15. The intermittently-measuring incremental position sensor circuit according to claim 12, further including error detecting means for raising an error flag upon detection of a sequence of measurement signals indicating sudden unexpected changes in position.

16. The intermittently-measuring incremental position sensor circuit according to claim 15, wherein a raised error flag outputs an error signal from the intermittently-measuring incremental position sensor circuit.

* * * * *